United States Patent [19]

Davis

[11] Patent Number: 4,475,774
[45] Date of Patent: Oct. 9, 1984

[54] VEHICLE BRAKING SYSTEMS
[75] Inventor: John W. Davis, Coventry, England
[73] Assignee: Dunlop Limited, London, England
[21] Appl. No.: 346,887
[22] Filed: Feb. 8, 1982
[30] Foreign Application Priority Data
Feb. 21, 1981 [GB] United Kingdom ............... 8105561
[51] Int. Cl.³ .............................................. B60T 8/10
[52] U.S. Cl. ................................ 303/112; 188/181 T
[58] Field of Search ...................... 188/181 A, 181 T; 303/112, 113, 116, 119

[56] References Cited
U.S. PATENT DOCUMENTS
2,185,003 12/1939 Stoddard ......................... 188/181 T
4,326,608 4/1982 Pauwels ........................... 188/181 T Primary Examiner—Duane A. Reger
Attorney, Agent, or Firm—Stevens, Davis, Miller & Mosher

[57] ABSTRACT

A vehicle anti-skid braking system, particularly for motor cycles, which employs a pilot brake for the purpose of generating operating power for the anti-skid system. The pilot brake is mounted for limited movement so that torque reaction moves it to actuate, for example, a fluid pressure pump. Such a pump actuated by the pilot brake may be used to control application, release and re-application of a main brake or may act only to return to a master cylinder fluid released from the main brake during an anti-skid operation.

23 Claims, 20 Drawing Figures

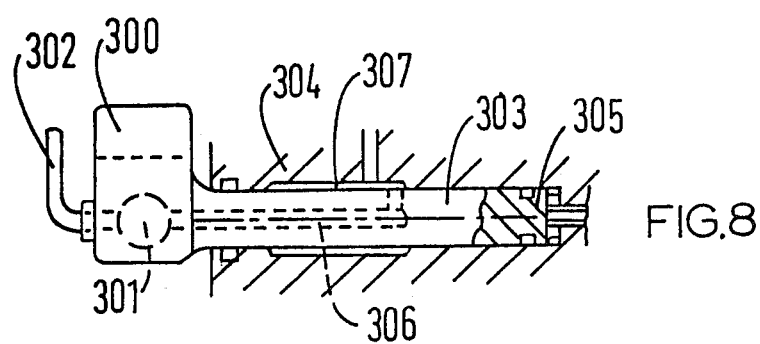
FIG.8
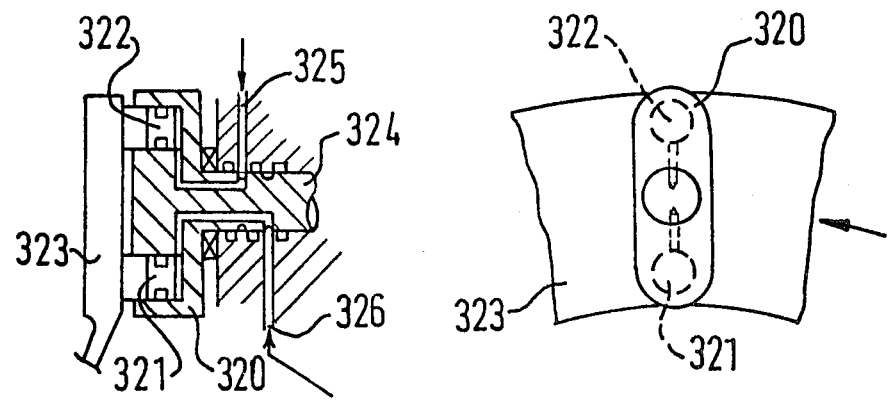
FIG.9
FIG.10

VEHICLE BRAKING SYSTEMS

This invention relates to vehicle braking systems, and particularly, but not exclusively, to anti-skid braking systems for light vehicles such as motor cycles.

Anti-skid braking systems for vehicles usually comprise a source of hydraulic pressure under the control of a driver's brake pedal and a skid-sensing device which determines the rate of deceleration of a wheel at any instant and acts to activate a brake-releasing mechanism whenever brakes are applied and the rate of deceleration of the wheel exceeds a predetermined value indicating that the wheel is about to lock.

In the application of an anti-skid system to a motor cycle a particular problem arises in that there is no convenient source of power for operating the system to re-apply the brake after each brake release in the performance of its skid-preventing function when this is required, following the initial application of pressure to the brake from a master cylinder operated by the rider's handlebar lever or foot pedal. An object of the present invention is to provide a vehicle anti-skid system which is particularly suitable for use with a motor cycle disc brake and which is intended to avoid the problem of providing an engine-driven source of hydraulic power by the provision of means of generating its own hydraulic power for anti-skid operation.

According to one aspect of the invention, an anti-skid system for a vehicle brake comprises a skid-sensing device for detecting an excessive rate of deceleration of a wheel, means operable by the said skid-sensing device for effecting release of a main wheel brake when an excessive rate of deceleration of the wheel occurs, and to govern re-application of said main wheel brake, and a pilot brake arranged to generate brake torque reaction and thereby supply operating power to the system.

The pilot brake may be employed to provide most of the power for operating the main brake, the pilot brake being arranged to be operable when no excessive rate of deceleration is detected by the skid-sensing device and arranged to generate brake torque reaction and thereby to apply the main wheel brake. Alternatively or additionally, the pilot brake may be employed in a hydraulically operated anti-skid system to actuate a pump for restoring into the operating part of the system, fluid released from a brake during an anti-skid operation.

According to a more specific aspect of the invention, an anti-skid system for a vehicle brake comprises a pilot brake, a control member arranged to be movable by brake torque reaction generated by the operation of the pilot brake, means operable by the control member to effect release of a main wheel brake, a skid-sensing device for detecting an excessive rate of deceleration of a wheel, and means operable by the said skid-sensing device for interrupting the operation of the pilot brake thereby to move the control member so as to effect release of the main wheel brake when an excessive rate of deceleration of the wheel occurs and to re-apply the main wheel brake when the excessive rate of deceleration is checked.

An anti-skid system in accordance with the invention for a hydraulic brake-applying mechanism associated with a main wheel brake may comprise a pilot brake arranged to be actuated hydraulically, a control member arranged to be movable by brake torque reaction generated by the operation of the pilot brake, pump means operable by the control member to supply fluid to the main wheel brake or to withdraw fluid therefrom, an anti-skid valve for interrupting communication between a driver's master cylinder and the main wheel brake, the anti-skid valve being arranged to be movable to an open position by said control member when brake torque reaction is developed by operation of the pilot brake, a skid-sensing device for detecting an excessive rate of deceleration of a wheel, and means operated by said skid-sensing device for interrupting the operation of the pilot brake thereby to move said control member so as to cause the pump means to withdraw fluid from the main brake when an excessive rate of deceleration is detected and to re-apply the pilot brake when the excessive rate of deceleration is checked, thereby to move the control member so as to cause the pump means to restore fluid pressure in the main brake.

The system described in the preceding paragraph does not rely on an external source of power for the repeated re-applications of the brake which take place during operation of the system to prevent the development of a skid: instead, it uses a relatively small, simple, pilot brake to operate a pump to provide the necessary hydraulic pressure.

Preferably the system in accordance with the invention operates by hydraulic means to actuate the pilot brake and the main brake. However, in alternative systems mechanical or other linkages may be employed.

Various embodiments of the invention will now be described by way of example, with reference to the accompanying drawings, in which:

FIG. 5A is a scrap cross-sectional view showing part of a valve assembly of FIG. 5;

FIG. 8 is a diagrammatic illustration of a further alternative pilot brake assembly, as viewed in the axial direction of an associated brake disc;

FIG. 9 is a cross-section in an axial plane showing a further alternative pilot brake assembly;

FIG. 10 is a side view of the assembly shown in FIG. 9;

Figure 1:
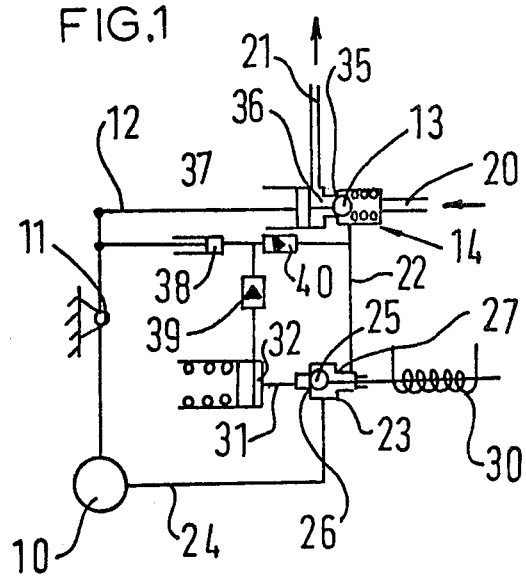
FIG. 1 is a schematic illustration of a system in accordance with the invention.

The system shown in FIG. 1, which forms part of a motor cycle front wheel braking system, comprises a pilot brake mechanism 10 in the form of a simple disc brake caliper mounted on a pivot 11 so that it is capable of limited movement when its pads engage a rotating disc. The brake caliper in effect constitutes a lever pivoted at the pivot 11 and acting on a control member 12 which is movable, when the pilot brake 10 is operated and engages the disc, rotating or tending to rotate in its normal direction of rotation for forward movement of the motor cycle, to displace a spring-loaded ball 13 from its seat in an anti-skid control valve 14.

Fluid pressure is supplied to the anti-skid control valve through a pipe 20 connected to a master cylinder operated, for example, by a motor cyclist's handlebar brake lever (not shown). The connection to a main disc brake (not shown) is via a pipe 21 on the opposite side of the ball valve 13. Normally, when the motor cycle is moving forward the valve 13 is held open from its seating 35 by residual drag on the pilot brake. This condition may be ensured by spring means (not shown) arranged to urge the pilot brake in the clockwise sense as shown in FIG. 1 about its pivot 11. Hence upon initial application of pressure from the master cylinder fluid is passed directly to the main brake. Fluid also passes through line 22 and a pilot brake control valve 23 and line 24 to actuate the pilot brake 10, the pilot brake control valve 23 being a 3-way valve in which a valve member 25 normally lies against a seat 26 to leave a passage for the flow of fluid through an opposite seat 27.

Actuation of the pilot brake, assuming that the associated disc is rotating or about to rotate in its normal direction of rotation, urges the pilot brake caliper to tend to tilt about its pivot 11 in the direction tending to open the anti-skid control valve 14 to permit fluid to pass from the master cylinder direct to the main brake (which normally engages the same disc) and to react master cylinder pressure acting upon a piston 37 associated with the control member 12. The main brake is a normal disc brake caliper which does not require description.

The pilot brake control valve is operated by a solenoid 30 under the control of a wheel deceleration detecting device and electronic anti-skid control circuit of conventional form which is arranged so that when it detects an excessive rate of deceleration of a wheel (which will normally be the wheel associated with the brake to be controlled) it energises the solenoid 30 to displace the valve member 25 from its seat 26 and into engagement with its opposite seat 27. In this state of the system, the line 24 supplying pressure to the brake operating cylinders of the pilot brake 10 is disconnected from the master cylinder and is connected to a line 31 through which fluid pressure can escape from the pilot brake 10 into a reservoir 32, causing the pilot brake to be released and consequently removing the force which it was previously exerting via the control member 12 on the piston 37 and the spring-loaded ball valve 13 in the anti-skid control valve 14. This causes the valve 13 to engage its seat 35, cutting off communication between the main brake and the master cylinder. Fluid pressure from the main brake is then released by a return flow of fluid into a reservoir 36 created by the movement of the piston 37 to the left as shown in FIG. 1. The piston 37 is arranged to be movable to the right as shown in FIG. 1 by the control member 12, constituting pump means, and it is free to move to the left once the thrust from the control member 12 has been removed.

Withdrawal of the piston 37 in the anti-skid brake control valve is accompanied by an induction stroke in second pump means comprising a pump 38 which is also operated by movement of the pilot brake 10 and is conveniently integral with the piston 37. The pump 38 is arranged to receive fluid from the reservoir 32 through a non-return valve 39 and to pump this fluid back into the pressurized side of the system via a second non-return valve 40 on re-application of the pilot brake, the fluid being returned to the line 22.

Figure 2:
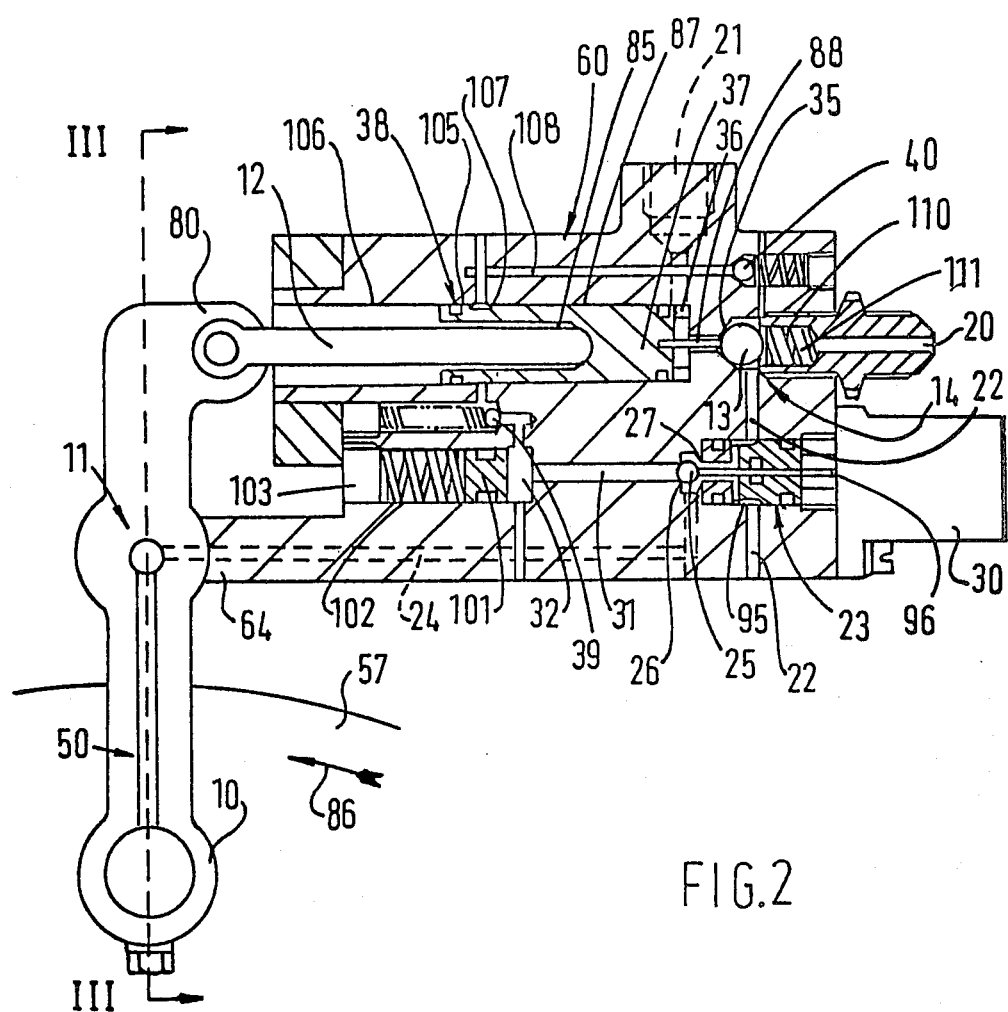
FIG. 2 is a side view, partly in cross-section, of a pilot brake and control system assembly in accordance with the invention.
Figure 3:
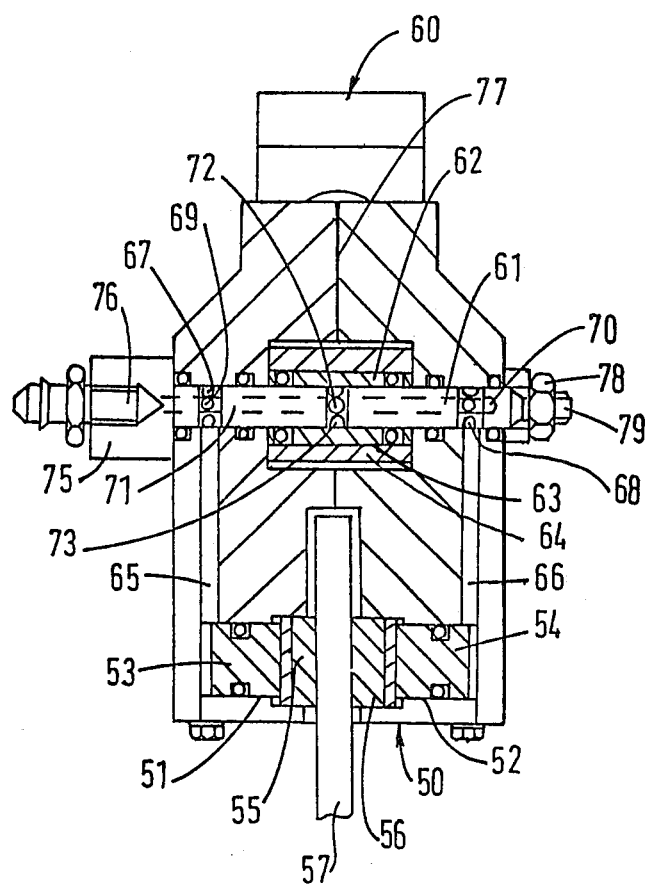
FIG. 3 is a cross-sectional view on the line III—III of FIG. 2.

In the practical embodiment of the invention illustrated in FIGS. 2 and 3 components corresponding to those illustrated diagrammatically in FIG. 1 are identified by the same reference numerals as those in FIG. 1. The pilot brake 10 comprises a swinging caliper 50 having cylinder bores 51, 52 in which pistons 53,54 are slidable to engage brake friction pads 55, 56 respectively and to press the friction pads into engagement with a rotatable disc 57 mounted for rotation with a motor cycle wheel. Conveniently, the swinging caliper 11 of the pilot brake is pivotally mounted on a housing 60 which is itself mounted on the non-rotatable housing of a main brake (not shown) engageable with the same disc 57.

The pilot brake caliper 50 is pivotally mounted by a pin 61 in a bearing sleeve 62 located in a bore 63 of an extension 64 of the housing 60. Hydraulic connections to the cylinders 51,52 are made via passages 65,66 which connect with annular spaces 67,68 around reduced-diameter portions of the pin 61 which communicate, via radial bores 69,70 with an axial drilling 71 through the pin 61. Fluid is supplied to the drilling 71 through a radial bore 72 communicating with an annular space 73 into which the passage 24 of the housing leads. At one end of the pin 61 an enlarged head 75 is provided, and a hydraulic bleed screw assembly 76 is incorporated in the head 75. The caliper 50 is in two parts which meet at an interface 77 and are held together by an axial clamping load supplied by a nut 78 engaging a screw threaded end 79 of the pin 61.

The pilot brake caliper 50 is free to pivot within the sleeve 62, fluid-tight joints being maintained by suitably positioned 'O' rings. A control member 12 in the form of a thrust rod is pivotally secured to the end 80 of the caliper remote from the brake friction pads and engages a socket 85 of the piston 37 so that on normal applications of the pilot brake to the disc 57, the disc rotating or tending to rotate in the direction indicated by the arrow 86, the piston 37 is urged towards the right-hand end of its cylinder 87 as shown in FIG. 2. A pin 88 extends axially from the end face of the piston 37 so as to be engageable with the spring-loaded ball 13 and to displace it from its conical seat 35 when the piston is driven to the right hand end of the cylinder as seen in FIG. 2. In this position fluid flow from the valve 14 to the main brake via pipe 21 is permitted by slots in the face of the piston 37.

As illustrated in FIG. 2, the pilot brake control valve 23 comprises a gland assembly 95 fluid-tightly secured in a bore of the housing 60 and having a central sealed passage through which a rod 96 is fluid-tightly slidable under the control of the solenoid 30. At one end of the rod 96 a valve member 25 is engageable with a seat 26 formed in the housing or with a seat 27 formed on the gland assembly 95 according to the state of operation of the solenoid 30. The operation of the pilot brake control valve 23 is as described with reference to FIG. 1.

The reservoir 32 into which fluid is released from the pilot brake by an anti-skid operation comprises a spring-loaded piston 101 slidable in a bore 102 which is vented to atmosphere at its end 103. The piston 101 urges fluid contained in the reservoir towards the pump 38 through the spring-loaded non-return valve 39.

The pump 38 illustrated diagrammatically in FIG. 1 is formed integrally with the piston 37 which incorporates a portion 105 of increased diameter sliding in a portion 106 of the bore 87 which is of correspondingly increased diameter, the pump chamber being constituted by the annular volume between the portion 105 and the shoulder 107 where it meets the narrower-diameter portion of the bore. The pump 38 is connected to draw fluid through the non-return valve 39 on its induction stroke and to expel fluid through a passage 108 on its pressure stroke, the passage 108 being provided with a spring-loaded non-return valve 40 and being connected through a passage 110 to a chamber 111 formed at the right-hand side of the valve 13 as seen in FIG. 2, communicating with passages 20 and 22.

The operation of the system illustrated in FIGS. 2 and 3 is as previously described with reference to FIG. 1. In normal operation of the brake, when no excessive rate of wheel deceleration is detected, the torque reaction generated by operation of the pilot brake holds the piston 37 in the position shown in FIG. 2. This establishes communication between the main brake and the master cylinder to permit normal application and release of the brake.

When an incipient skid causes the pilot brake to be released by the action of the solenoid valve 30, 25, fluid flows from the pilot brake into the reservoir 32, and the pilot brake ceases to apply a torque reaction thrust to the control member 12 and piston 37. This permits the piston 37 to be moved, as seen in FIG. 2, to the left by the fluid pressure present in the main brake. The valve 14 closes to isolate the main brake from the master cylinder, and as the reservoir 36 increases in volume the pressure in the main brake falls: movement of the piston 37 to the left ceases when the pilot brake is reapplied or when the main caliper pressure has fallen to zero.

The function of the pump 38 is to return to the master cylinder the small quantity of fluid exhausted from the pilot brake in each brake-release operation. This replenishes the master cylinder so that the associated brake lever is maintained in an operable condition even during sustained periods of anti-skid braking.

It will be observed that since the pilot brake caliper can only move the piston 37 to the right as shown in FIG. 2 when the disc 57 is rotating in its normal direction for forward movement of the motor cycle, the valve 13, 35 will remain closed whenever the disc rotates, or tends to rotate, in the reverse direction. In these circumstances only the pilot brake will operate and this may be found to be adequate for most purposes. If additional braking torque is required in a particular case, such as for a very heavy motor cycle, it would be possible to provide an additional "parking brake", or to provide a by-pass connection under the control of a valve operated by reverse movement of the pilot brake caliper or by solenoid means under the control of the electronic system.

Figure 1A:
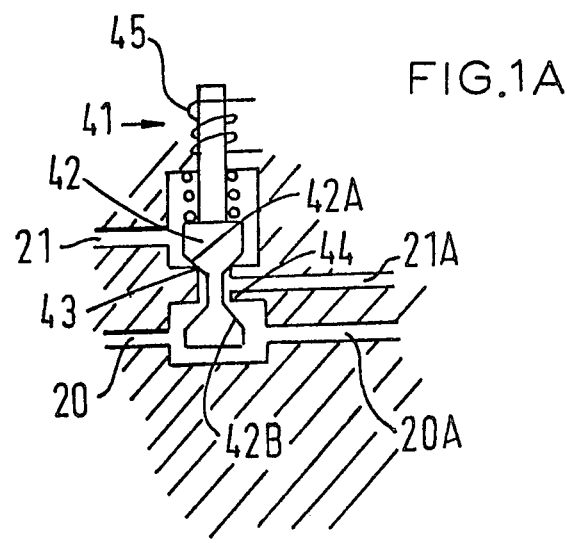
FIG. 1A is a scrap cross-sectional view showing a modification to the system of FIG. 1.

FIG. 1A shows a modification of the system illustrated in FIG. 1 with the principal object of ensuring that the main brake can be operated even when the associated wheel of the vehicle is tending to rotate in the reverse direction, for example when holding the vehicle on a hill. For this purpose the line 20 to the master cylinder and line 21 to the brake as illustrated in FIG. 1 are connected to a valve assembly 41 in which a valve member 42 is spring-loaded normally to close communication between the line 21 and the line 21A leading to the brake when a conical surface 42A on the valve member 42 engages a corresponding seat 43. Thus when the valve member 42 is seated as shown in FIG. 1A fluid cannot be released from the main brake by action of the control piston 37 associated with the pilot brake. In this condition of the valve assembly 41 the master cylinder (connected through line 20A), is in communication with the brake through line 21A, the valve member 42 having a second conical surface 42B which is normally held away from its corresponding seat 44 by its spring-loading.

The valve member 42 is movable by the action of a solenoid 45 which is arranged to be actuated simultaneously with any operation of the system to release fluid from the brake for anti-skid purposes, to a position in which it closes communication between the lines 20A and 21A, and opens communication between lines 21 and 21A thus allowing anti-skid operation to take place as previously described.

Thus the modification shown in FIG. 1A ensures that the action of the pilot brake in a condition of reverse braking does not interfere with the operation of the main brake.

The anti-skid device described above may be mounted on any suitable non-rotatable structure adjacent an associated wheel disc or drum: its construction however lends itself to incorporation in or on the brake housing of a conventional main disc brake caliper.

FIGS. 4 to 7 show a more developed version of the system illustrated in FIGS. 1 to 3. Its operation is broadly similar to that described above, and it incorporates a pilot brake caliper 200 and control unit 201. The pilot brake is of the opposed-cylinder type, incorporating pistons 202, 203 engaging friction pad assemblies 204, 205, which each consist of a sintered metal friction lining, steel backing plate, and heat insulator. The brake housing is split, comprising two halves secured together by nut and bolt assemblies 207, 208. Fluid passages 209, 210 connect the hydraulic cylinders 211, 212, with axial bores 213, 214 through a pivot pin 215 and communicate via radial drillings 216 with an annular space 217, and via drilling 218 with a pipe 219 leading into the control unit 201 (see FIG. 4).

The pilot caliper 200 is freely pivotable about the pin 215, as described in the embodiment illustrated in FIGS. 1 to 3, and is provided with a cross-head 220 to which pistons 221 and 222 are coupled so that the pistons are movable in their associated cylinder bores within the control unit assembly by swinging movement of the caliper 200 about its pin 215. A linkage 223 which controls the movement of the piston 222 constitutes a control member having a similar function to the control member 12 of the embodiment shown in FIGS. 1 to 3, but instead of providing the required pumping action for the return of fluid to the master cylinder by means of a stepped-diameter piston, a separate pump is provided by the piston 221, actuated by a separate linkage 224.

Figure 5:
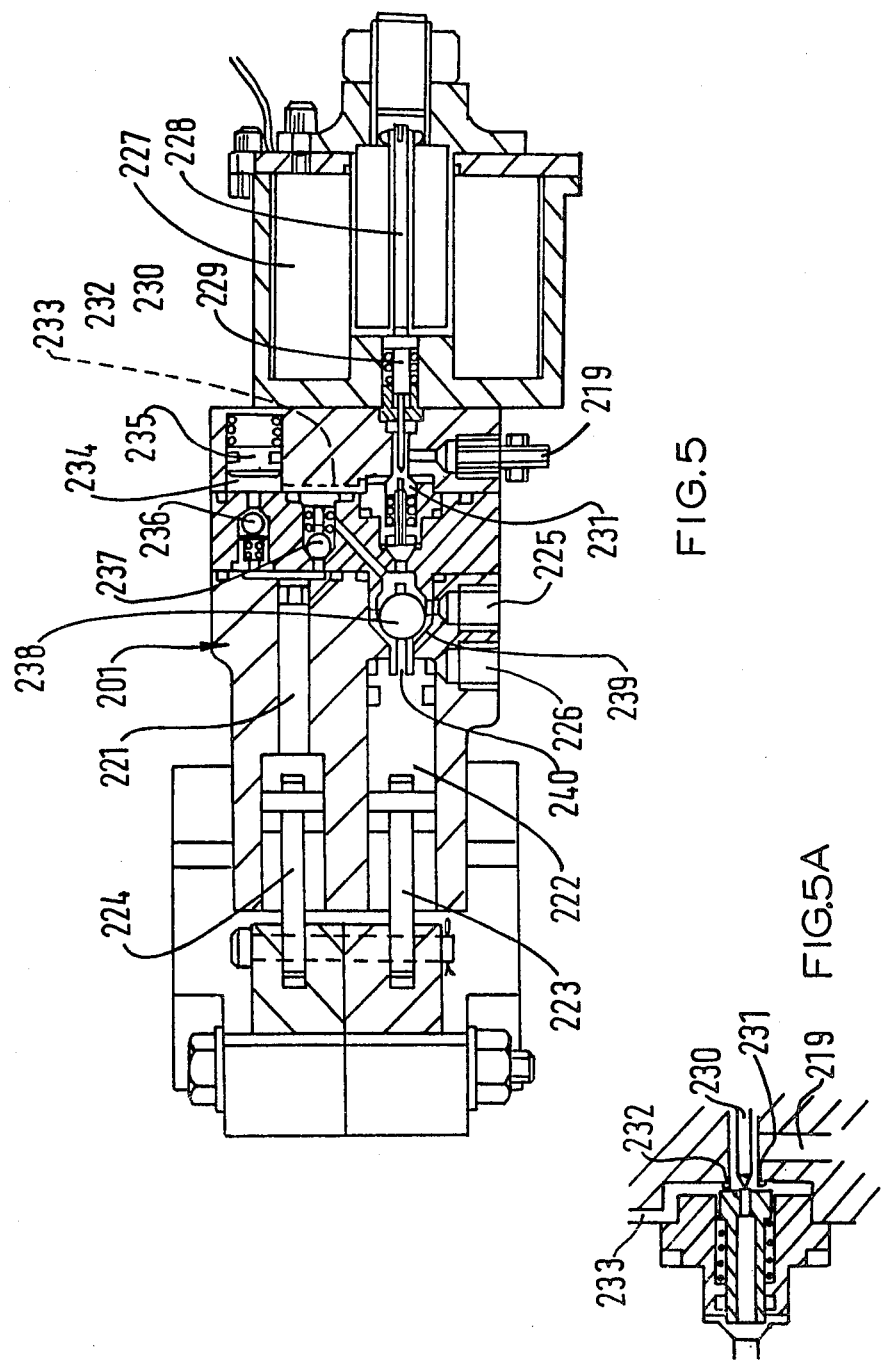
FIG. 5 is a plan view of the assembly shown in FIG. 4.
Figure 6:
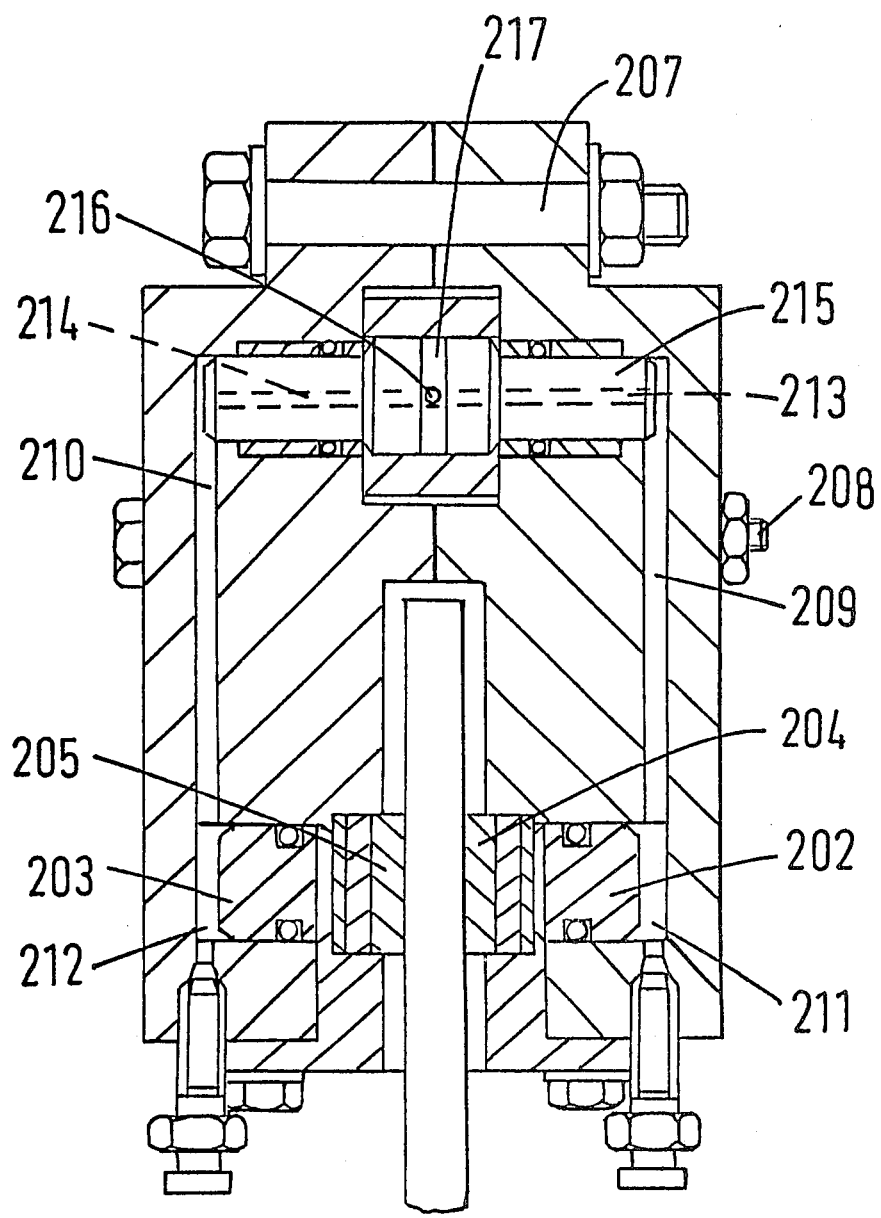
FIG. 6 is a cross-sectional end view of the assembly shown in FIG. 4.

The inlet from the master cylinder is indicated at 225 and the outlet to the main brake at 226. The control unit 201 comprises a solenoid 227, a solenoid plunger 228, a spring-loaded thrust member 229, a valve member 230, and a spring-loaded hollow valve member 231 which is normally held in engagement with a valve seat 232 permitting communication from the master cylinder inlet 225 through the hollow member 231 into the pipe 219 through which fluid pressure is supplied to the pilot brake. When the solenoid 227 is actuated to check a skidding condition, the valve 230 closes the central opening through the valve member 231 and then moves the valve member 231 axially to the left as shown in FIG. 5 to open communication from the pilot brake cylinders through a passage 233 to a reservoir 234 incorporating a spring-loaded piston 235. As in the system previously described fluid from the reservoir 234 is pumped back into the master cylinder line on the return stroke of the pilot brake, the piston 221 acting to draw fluid through a non-return valve 236 on the brake-release stroke and drive the fluid through a second non-return valve 237 on the brake re-application stroke.

Control of the pressure in the main brake is governed by a spring-loaded ball valve 238 which is normally held off its seat 239 by a pin 240 formed on the piston 222, but which closes on to its seat on the withdrawal of the piston 222, and fluid from the main brake is then withdrawn into the space created by movement of the piston 222 to the left as seen in FIG. 5.

Figure 4:
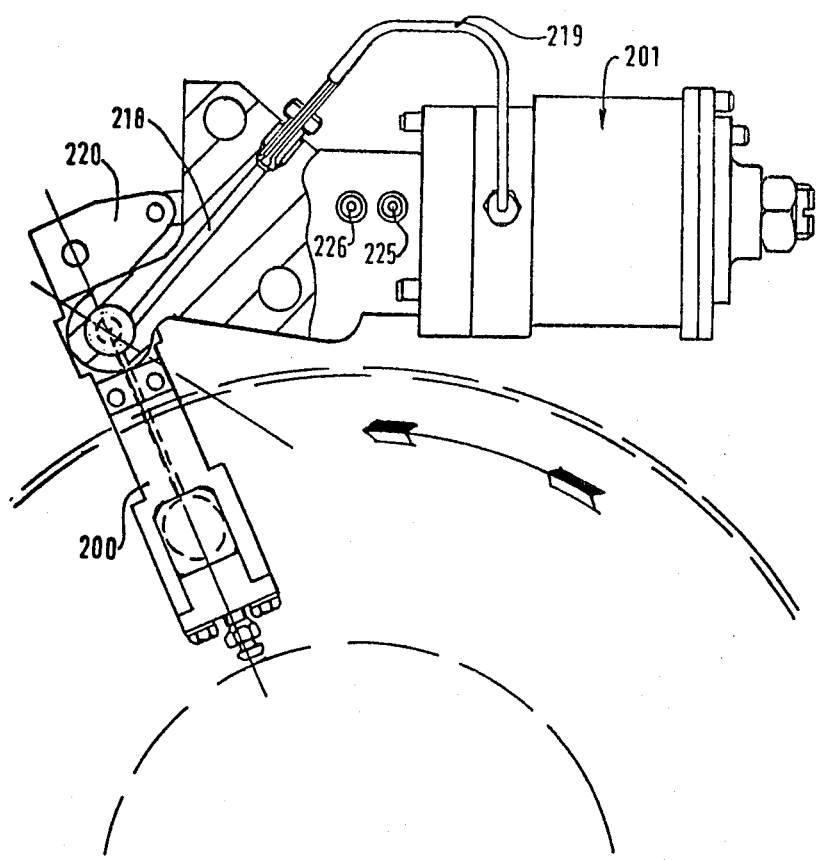
FIG. 4 is a side view, partly in cross-section, of an alternative pilot brake and control system assembly in accordance with the invention.
Figure 7:
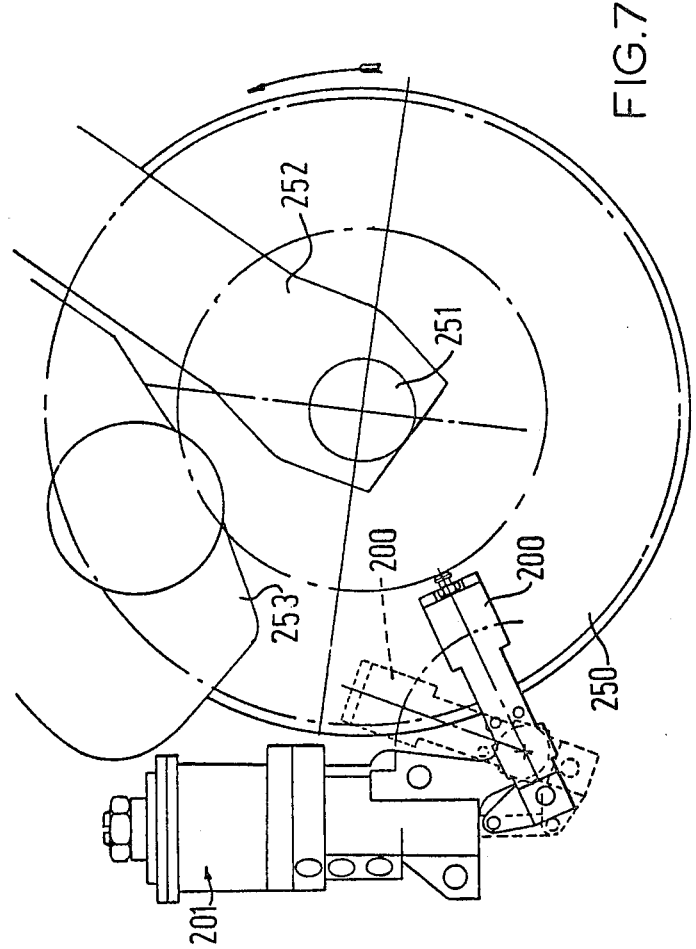
FIG. 7 is a side view of a motor cycle front fork and disc brake assembly, incorporating a pilot brake assembly of the kind shown in FIGS. 4 to 6.

FIG. 7 indicates the position of installation of the pilot brake and control unit assembly of FIGS. 4 to 5, mounted on a bracket (not shown), adjacent the forward edge of a brake disc 250 supported on an axle 251 of a motor cycle front fork assembly 252. The main disc brake is indicated by reference 253, and the position of the pilot brake following a brake-releasing action of the control unit is indicated in dotted lines.

While in the two examples described above the pilot caliper is arranged to swing about a pivot, one alternative, shown in FIG. 8, is to arrange for the pilot caliper to be slidable in a chordal direction parallel to the disc. As shown in FIG. 8, a caliper 300 incorporating brake cylinders 301, one on each side of the disc and connected by a bridge pipe 302, is mounted on a cylindrical shaft 303 slidable between fixed abutments in a housing 304 which may form part of a control unit and which may be integral with a main disc brake. The shaft 303 provides at one end, a control piston 305 for the main brake arranged to operate in a similar manner to that of the embodiments described above, and the supply of hydraulic fluid to the pilot brake is arranged through an axial passage 306 through the shaft 303 and communicating with an annular space 307 of the housing in all positions of the caliper.

While the pilot brakes described above employ opposed-cylinder calipers, calipers having a cylinder at only one side may be employed, and since the braking thrust required is relatively low it may be possible to utilise an unbalanced brake acting on one side of the disc only. FIGS. 9 and 10 illustrate a pilot brake assembly 320 incorporating two piston and cylinder mechanisms 321, 322 arranged to apply friction pads to one side only of a disc 323. The pilot brake 320 is carried on a central pivotting shaft 324 in the construction shown in FIGS. 9 and 10 and separate connections 325 and 326 are provided to the hydraulic mechanisms 321 and 322 for a purpose to be described later in this specification.

In addition to the arrangements described above the pilot brake may alternatively consist of a friction mechanism arranged to engage other rotatable surfaces such as the braking surface of a brake drum, the outer peripheral edge of a brake disc or any other surface of a brake disc, drum, or wheel. The pilot brake may constitute a completely independent brake assembly. A simplified system in accordance with the invention is illustrated diagrammatically in FIG. 11. In this system, a main brake cylinder 350 is arranged initially to receive fluid pressure from a master cylinder 351 through a normally-open by-pass valve 352 which is held open by a plunger 353 under the action of a pilot brake caliper 354, carried on a pivot 355, normally held in the position shown in FIG. 11 by a return spring 356. Fluid pressure is thus initially passed to the brake cylinder 350 through a line 357, but since the pilot brake 354 is also actuated, brake drag on the pilot brake tends to cause the valve 352 to close and subsequent pressurisation of the main brake is effected by the movement of a piston 358 in an associated cylinder 359 actuated mechanically by movement of the pilot brake 354 about its pivot 355. The major part of the operating power for the main brake is therefore normally supplied by this action of the pilot brake.

The supply of fluid pressure to the pilot brake 354 is governed by a three-way solenoid operated valve 360 having ports A, B and C connected respectively to the master cylinder, the pilot brake, and the fluid reservoir 361 of the master cylinder. An associated disc 362 is indicated in dotted lines, its normal direction of rotation for forward movement of the associated vehicle being indicated by the arrow.

Figure 11:
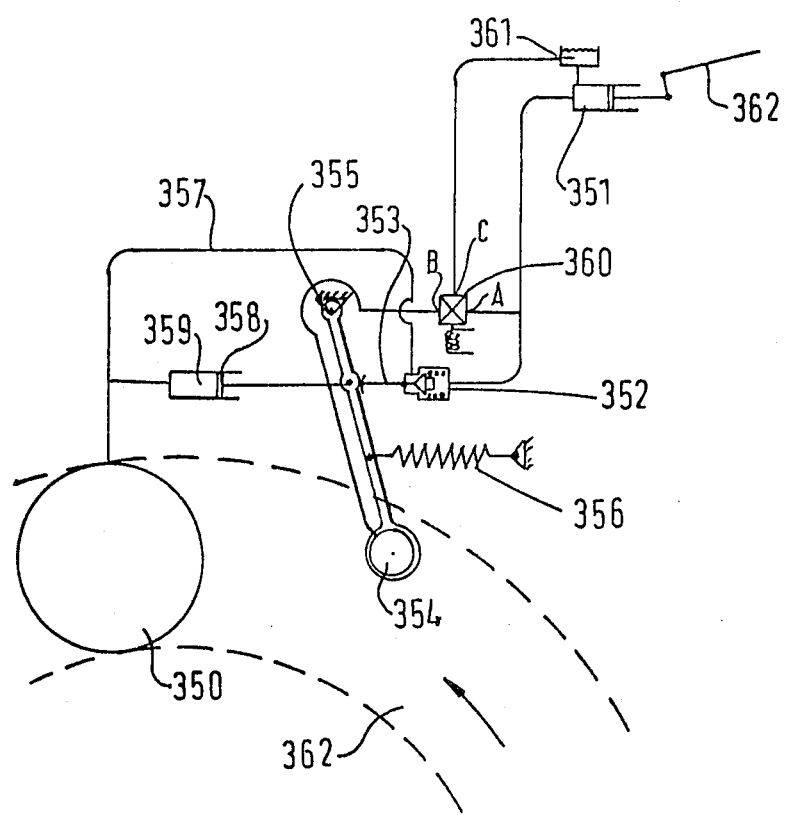
FIGS. 11 and 12 are schematic illustrations of alternative systems in accordance with the invention.

The operation of the system shown in FIG. 11 is as follows:

In the "brakes off" state, the pilot brake is held in the position shown with the by-pass valve open and the main brake cylinder 350 held at zero pressure by its connection, through the normal master cylinder recuperation device, to the fluid reservoir 361.

For normal brake operation, the solenoid valve connects ports A and B with port C isolated. Fluid flows from the master cylinder 351 to the pilot brake 354 and also initially to the main brake via the by-pass 352. If the vehicle is moving forward, the pilot brake moves in the direction of a disc rotation and after a very small movement causes the by-pass valve 352 to close, thus isolating the main brake from the master cylinder, and the main brake is then further applied by fluid displacement from the cylinder 359. Brake application pressure is therefore controlled by the master cylinder pressure applied only to the pilot brake which exerts force on the piston 358, hence making the cylinder 359 a source of pressure to apply the main brake in proportion to the driver's effort applied to the operating hand or foot lever 362 of the master cylinder.

The by-pass 352 functions to ensure that adequate braking is provided via direct application of fluid pressure from the master cylinder, through the by-pass valve, to the main brake cylinder 350 even if the associated disc 362 is tending to move in the reverse direction to that shown by the arrow. It also serves to ensure that the brake can be operated in the event that the pilot brake fails to operate, since in this condition the by-pass valve will be held open.

The three-way valve 360 is controlled by a skid-sending system which may be of conventional form and acts, when an incipient skid is sensed, to connect ports B and C, isolating port A. In this condition fluid pressure is released from the pilot brake and exhausted to the fluid reservoir 361, and the pilot brake is urged back towards the position shown in FIG. 11 by main brake pressure acting upon the piston 358 and by the return spring 356, thus withdrawing fluid from the main brake into the cylinder 359 until the skid is checked. At this point the solenoid valve is restored to its original state and the pilot brake is again actuated, causing re-application of the main brake through displacement of the piston 358. Although there is a loss of fluid from the master cylinder to its fluid reservoir each time that the pilot brake is released in this manner, the loss of fluid is quite small and the system may operate for a number of cycles, for example 30, before the lever 362 reaches its position of full travel. If this should occur during a sequence of braking operations it will be necessary for the driver to release and re-apply his brake lever, thus effecting recuperation of the fluid in the master cylinder in the normal manner. This system for the recuperation of fluid released during anti-skid operations is practicable in the context of the system in accordance with the invention since the pilot brake has a very small fluid capacity relative to that of the main brake.

Figure 12:
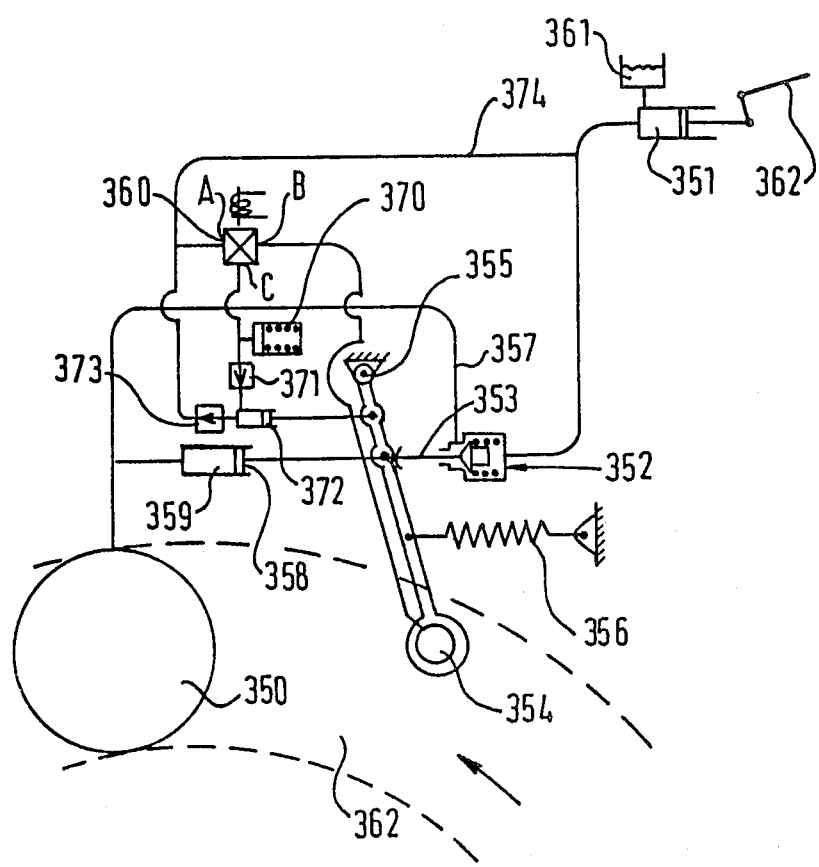

In order to avoid the possible need for release and re-application of the brake lever 362 in the system shown in FIG. 11 a system for returning fluid released from the pilot brake directly into the master cylinder line is shown in FIG. 12. Most of the components of this system are similar to those of FIG. 11, and the same reference numerals have been used where appropriate.

In FIG. 12, instead of connecting port C to the fluid reservoir 361 (as shown in FIG. 11) fluid released from the pilot brake 354 during a skid correction operation is allowed to flow into a fluid pressure receiver 370 where it is held at low pressure and from which it may be withdrawn through a non-return valve 371 into a "pumping" cylinder 372 on the return stroke of the pilot brake. When the pilot brake is re-applied the withdrawn fluid is then pumped through a non-return valve 373 and line 374 back to the master cylinder 351. The action of the system shown in FIG. 12 is similar to that of the system in FIG. 11 with the exception that the fluid released from the pilot brake is not returned to the reservoir 361 and the hand lever 362 therefore does not travel towards the end of its stroke during an application of the brake in which the anti-skid system is in operation. Thus the system of FIG. 12 can continue to operate indefinitely following a single operation of the operating lever 362.

Figure 13:
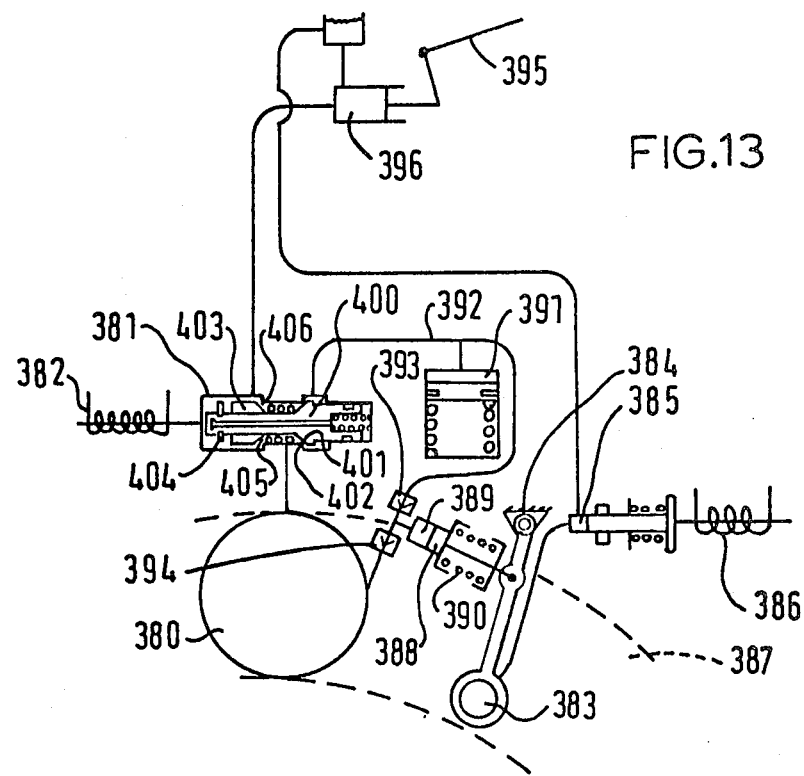
FIG. 13 is a schematic illustration of a further alternative system in accordance with the invention.

FIG. 13 illustrates a system in which the anti-skid control is applied directly to the main brake cylinder 380, through a 3-way skid control valve 381 operated by a solenoid 382. In this system a pilot brake 383, pivoted at 384 is not used to provide initial brake application pressure, but is used as a pump motor to effect re-application of the main brake following a brake release operation. In this system, the skid-sensing device does not directly effect release of the pilot brake in order to withdraw pressurised fluid from the main brake 380: instead, a second solenoid-operated pressure device in the form of a simple pump cylinder 385 operated by a solenoid 386 is provided to apply and release the pilot brake alternately so as to cause it to execute a series of rapid oscillations about its pivot 384 as its friction pads are applied to the rotating brake disc 387 and released, sequentially. The pilot brake 383 is mechanically connected to a pump piston 388 acting in a cylinder 389 with a return spring 390 and arranged to pump fluid from a receiver 391 connected to a discharge line 392 from the main brake cylinder 380 via the skid control valve 381. Non-return valves 393 and 394 are provided in the line 392 so that fluid may be pumped, by a sequence of strokes of the pilot brake about its pivot, from the receiver 391 into the main brake operating cylinder 380.

Figure 13A:
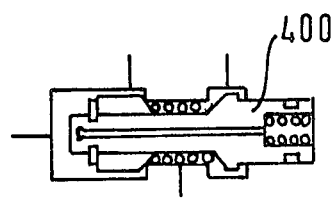
FIGS. 13A and 13B are diagrammatic views showing the function of a valve in the system of FIG. 13.
Figure 13B:
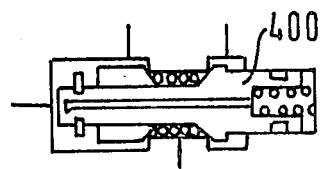

The skid control valve 381 is shown in three different states of operation in FIG. 13, FIG. 13A, and FIG. 13B.

In FIG. 13 the system is shown in the normal brake operating condition, in which operation of a driver's lever 395 creates a pressure P1 in the fluid in the master cylinder 396 and communicates this pressure into the main brake cylinder 380. Designating the pressure in the main brake cylinder as "P2", in this condition P1 equals P2.

The skid control valve 381 comprises a first valve member 400 which is spring-loaded and urged normally towards the position shown in FIG. 13 in which a conical surface 401 on the valve member 400 engages a seat 402, isolating the main brake cylinder 380 from the receiver 391 into which fluid is intended to be discharged during anti-skid operations. The valve member 400 carries a second valve member 403 which is slidable on the valve member 400 and spring-urged towards the left-hand end as seen in FIG. 13, where its leftward displacement is arrested by a stop 404. A conical surface 405 on the valve member 403 is thus held clear of a seat 406, permitting communication between the master cylinder and the main brake cylinder.

When the solenoid 382 is energised to initiate a skid-preventing operation it moves the valve member 400 to the position shown in FIG. 13A, isolating the master cylinder pressure P1 from the main brake cylinder 380 and simultaneously releasing fluid from the main brake cylinder into the receiver 391. At the end of the brake-release operation, the solenoid 382 is de-energised and the valve member 400 is spring-urged back to the position shown in FIG. 13B, in which the conical surface 401 again engages its seat 402 to prevent further release of fluid from the main brake cylinder 380. In this condition the fluid pressure (P1) in the master cylinder exceeds the pressure (P2) in the main brake cylinder and the sliding valve member 403 is held, as shown in FIG. 13B, against its seat by this difference in pressure. This gives rise to a condition in which the main brake cylinder is isolated from both master cylinder and receiver, and in which fluid may effectively be restored to the main brake from the receiver 391 by the pump 388, 389. The main brake cylinder 380 will therefore be isolated from the master cylinder for the whole time when the system is operating to check an incipient skid, until full pressure is restored and P2 again rises to the same level as P1 but the main brake is intermittently connected to the receiver to reduce pressure to control incipient skidding by the valve 381 alternating between the conditions shown in FIGS. 13A and 13B.

Figure 13C:
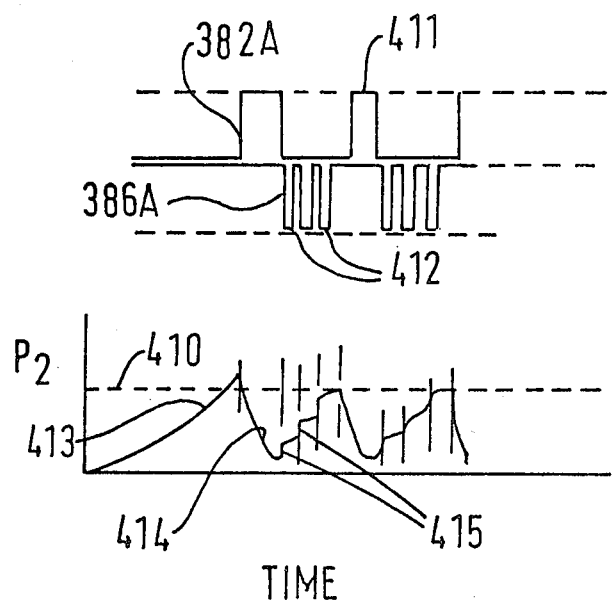
FIG. 13C illustrates graphically the function of the system of FIG. 13.

FIG. 13C illustrates the operation of the solenoids 382 and 386, and their effect on the changes in pressure in the main brake cylinder 380 (P2). When the brake pressure P2 rises to a level 410 at which the associated wheel is tending to lock, the associated skid-sensing circuit actuates the solenoid 382 (waveform labelled "382A"). The portions 411 of the waveform indicate the periods of operation of the solenoid 382. On release of the solenoid 382, the pilot brake operating solenoid 386 (waveform labelled "386A") is triggered to produce a series of short pulses 412 which cause the pilot brake to be pressurised and released alternately and thus to execute a series of strokes which drive the piston 388 to pump fluid in each pressure stroke from the receiver 391 into the main cylinder 380.

The graph of pressure P2 against time in FIG. 13C shows a rising portion 413 until the wheel-locking level 410 is exceeded, and a brake-releasing portion 414 during which the pressure P2 drops to a low level. The pressure P2 is then built up again in a series of short steps 415 corresponding to the pulses 412, until the level 410 is again reached, following which the cycle is repeated.

Figure 14:
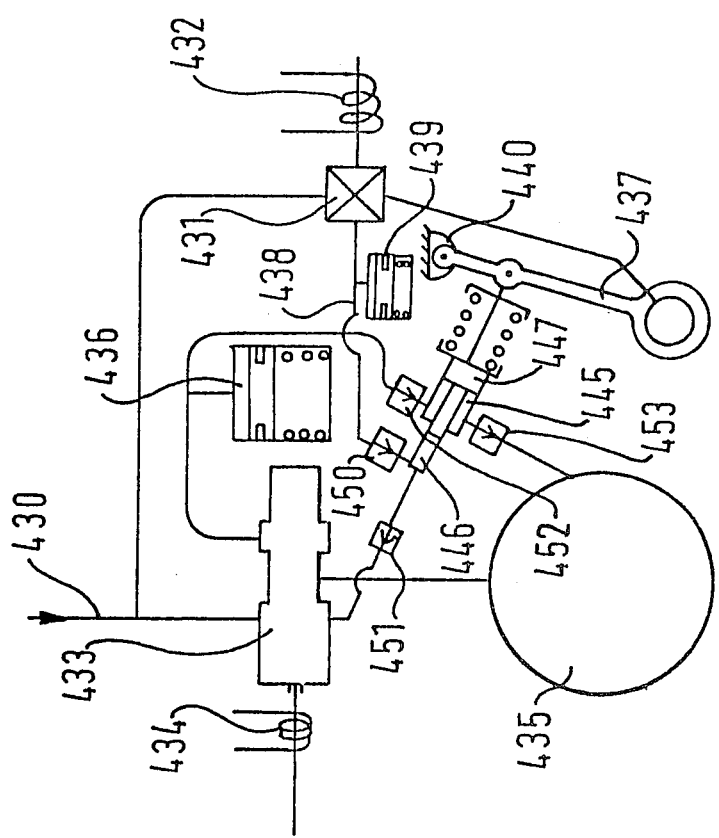
FIG. 14 and FIG. 15 are schematic illustrations showing further alternative systems in accordance with the invention.

FIG. 14 shows a system which operates in a generally similar manner to that shown in FIG. 13 except that instead of using a solenoid-operated pump to apply the pilot brake, pressure is supplied to the pilot brake from the master cylinder line 430 through a 3-way valve 431 under the control of a solenoid 432.

A control valve 433, similar to the valve 381 of FIG. 13, is arranged in response to actuation of a solenoid 434 to connect the main brake cylinder 435 to the master cylinder or to exhaust fluid from the main brake cylinder into a fluid receiver 436.

Normally the solenoid 432 is de-energised, leaving the valve 431 in a condition in which the cylinders of the pilot brake 437 are connected to the line 438 and the connection to the valve 431 from the master cylinder is isolated. When the solenoid 432 is energised the valve 431 connects the master cylinder to the pilot brake and isolates the line 438.

The solenoid 432 is controlled electrically during an anti-skid operating sequence so as to operate the valve 431 to cause a series of movements of the pilot brake 437 about its pivot 440 which actuate two separate fluid pumps 445 and 446 having a common piston 447 of stepped diameters. The pump cylinder 446 operates to withdraw fluid which has been released from the pilot brake into the receiver 439, through a non-return valve 450 and displaces this fluid into the master cylinder line through the non-return valve 451, whilst the pump 445 draws fluid from the main brake receiver 436 through a non-return valve 452 and displaces it through a non-return valve 453 into the main brake cylinder 435. Both of these pumping actions are arranged to occur on the brake re-application cycle of the system. This system lends itself to electronic control of the rate of re-application of the brake, as in the case of the system shown in FIG. 13 where the mark to space ratio of the pulses applied to the solenoid for applying and releasing the pilot brake can be controlled in response to an electrical signal corresponding to the rate at which the wheel is regaining speed following a skid.

Figure 15:
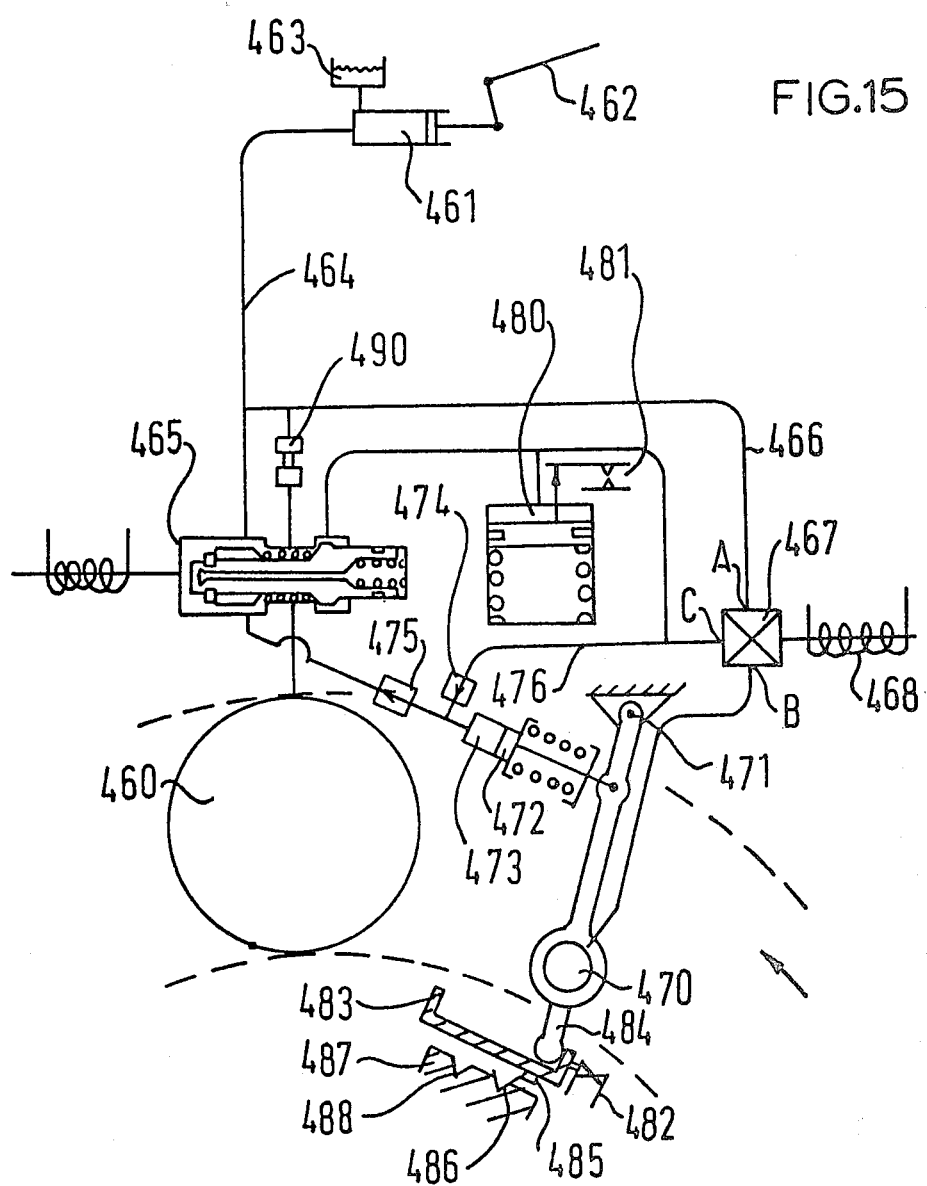

FIG. 15 shows a system in which a main brake cylinder 460 is supplied with pressure from a master cylinder 461 operated by a lever 462 and having a fluid reservoir 463. A master cylinder line 464 is connected to a skid control valve 465 which is similar in construction to that shown in FIG. 13, and is connected via a line 466 to a 3-way valve 467 operated by a solenoid 468. A pilot brake 470 mounted on a pivot 471 is arranged to move a piston 472 in a pump cylinder 473 and non-return valves 474 and 475 are provided to enable reciprocating movement of the pilot brake to pump fluid from a line 476 into the master cylinder line 464 via the connection shown into the valve 465. The pump cylinder 473 actuated by the pilot brake is thus arranged when the valve 467 operates to connect the line 476 to the cylinder of the pilot brake 470 and to seal off the line 466, to draw fluid from the cylinder of the pilot brake and simultaneously from a fluid receiver 480 and pump it back into the master cylinder line 464 to maintain the operating lever in a normal operating position.

The pump action of the pilot brake 470 is initiated when the solenoid 468 operates the valve 467 as described above at the initiation of a brake re-application phase of the system. In order for the solenoid 468 to be energised, limit switches 481 and 482, associated respectively with the fluid receiver 480 and the pilot brake, must be in the closed condition, indicating that there is fluid in the receiver requiring to be pumped and that the pilot brake is in the position shown in FIG. 15 at the limit of its return stroke. The limit switch 482 is operated by a slidable member 483 which is engageable by a striker 484 attached to the pilot brake so as to be moved, at each end of the travel of the pilot brake so as to close the limit switch 482, or open the switch, respectively. A detent spring 485 attached to the slidable member 483 engages a notch 486 in a fixed member 487 when the pilot brake is in the position shown and during its leftward movement, and a second notch 488 is provided to hold the member 483 in a position displaced to the left as seen in FIG. 15 during return travel of the pilot brake, towards the position shown in FIG. 15. Thus the contacts 482 are held closed by the slidable member when the detent spring is in the notch 487 and opened when the slidable member 483 is moved to a position where the detent spring engages the notch 488 at the opposite end of the arc travelled by the pilot brake.

In the system shown in FIG. 15, the pumping stroke of the pilot brake is not under direct control of the solenoid 468 as in the system of FIG. 14, but is effected automatically by the operation of the limit switch 482 actuated by movement of the pilot brake once the solenoid 468 has placed the valve 467 in the appropriate position.

During re-application of the main brake 460 in the system shown in FIG. 15, a controlled flow of fluid is supplied from the master cylinder line 464 through a fixed restrictor 490.

The systems shown in FIGS. 13, 14 and 15 each employ the pilot brake in a function which is primarily designed to restore fluid into the master cylinder line following a brake-releasing action. In these systems the pilot brake acts as a pump motor, and for this purpose, a pilot brake structure as illustrated in FIGS. 9 and 10 is particularly useful since it enables a double acting pumping action to be used. The housing 320 is arranged to rotate in one direction when the cylinder 321 is pressurised and in the opposite direction when the cylinder 322 is pressurized owing to the central position of the shaft 324 between the two cylinders. By cyclically switching the supplies to the two cylinders an oscillatory movement of the housing about its pivot and hence a double-acting pump action can thus be achieved, and a mechanism of this kind can readily be adapted for use in any of the systems shown in FIGS. 13 to 15. Instead of operating a double-acting pump, one direction of rotation of the housing 320 may be used simply as a fast-acting return stroke, without the need for a return spring; in this case the pivot may be displaced from a central position between the cylinders to give different leverage for pumping and return strokes.

It will be appreciated that certain features of some of the various embodiments described above may be combined with features of other embodiments to provide further alternative arrangements within the scope of the invention.

Having now described my invention what I claim is:

1. An anti-skid system for a vehicle brake comprising a skid-sensing device for detecting an excessive rate of deceleration of a wheel, means connected between a main wheel brake and the skid-sensing device for effecting release of said main wheel brake when an excessive rate of deceleration of the wheel occurs and operably connected to govern re-application of said main wheel brake and a pilot brake positioned to be activated by brake torque reaction and connected to supply operating power for the system.

2. An anti-skid system according to claim 1 comprising a control member operatively connected to be moved by brake torque reaction generated by the operation of the pilot brake, means connected between a main wheel brake and the skid-sensing device operable by the control member to effect release of said main wheel brake, and means operatively connected to said skid-sensing device for interrupting the operation of the pilot brake thereby to move the control member so as to effect release of the main wheel brake when an exessive rate of deceleration of the wheel occurs and to re-apply the main wheel brake when the excessive rate of deceleration is checked.

3. An anti-skid system in accordance with claim 1 including means to connect the pilot brake when no excessive rate of deceleration is detected by the skid-sensing device, so that the pilot brake transfers brake torque reaction to provide the major part of the operating power for the main wheel brake.

4. An anti-skid system for a vehicle brake comprising a pilot brake which is actuated hydraulically and movable by torque reaction thereon generated by the operation of the pilot brake, a control member operatively connected to the pilot brake to be movable by said brake torque reaction, pump means operatively connected to the control member to supply brake operating fluid to a hydraulically operated main wheel brake or to withdraw fluid therefrom, an anti-skid valve connected in a main brake operating system so as to control communication between a driver's master cylinder and the main wheel brake, the anti-skid valve being movable to an open position by said control member when brake torque reaction is developed by operation of the pilot brake, a skid-sensing device, and means operated by said skid-sensing device for interrupting the operation of the pilot brake thereby to move said control member so as to cause the pump means to withdraw fluid from the main brake when said skid-sensing device detects an excessive rate of deceleration and to re-apply the pilot brake when the excessive rate of deceleration is checked, thereby to cause the pilot brake to move the control member so as to cause the pump means to restore fluid pressure in the main brake.

5. An anti-skid system according to claim 4 wherein the pilot brake is mounted to be moved by torque reaction upon engagement of the pilot brake with a rotating disc and wherein the control member is attached to the pilot brake and connected to operate fluid pressure pump means and also to operate an anti-skid valve controlling a fluid connection between a driver's master cylinder and a main brake, the arrangement being such that pilot brake torque reaction normally holds the valve in an open position, a pilot brake control valve connected to release the pilot brake by release of fluid from the pilot brake when a skid is detected, whereby the anti-skid valve is closed by movement of the control member and the pump means receives fluid from the main brake so as to reduce the pressure in the main brake.

6. An anti-skid system according to claim 5 wherein second pump means actuated by movement of the pilot brake is connected to pump fluid released from the pilot brake mechanism into the main brake hydraulic system.

7. An anti-skid system according to claim 6 wherein a spring-loaded fluid pressure receiver is connected to absorb temporarily fluid released from the pilot brake.

8. An anti-skid system according to claim 6 wherein the second pump means is combined with the pump means as a piston having stepped diameters.

9. An anti-skid system according to claim 6 wherein the second pump means is separate from the pump means.

10. An anti-skid system according to any of claims 5 to 7 wherein the pilot brake control valve is connected to be actuated by a solenoid controlled by an electronic skid-sensing device in response to changes in wheel speed and acceleration.

11. An anti-skid system according to claim 4 including means for enabling the main brake to operate when the associated wheel is tending to rotate in the reverse direction.

12. An anti-skid system according to claim 11 wherein the means for enabling the main brake to operate comprises a solenoid-actuated valve operatively connected to the skid-sensing device to prevent release of fluid from the main brake by operation of the pilot brake when no skid condition is sensed.

13. An anti-skid system according to claim 1 wherein the pilot brake is mounted for pivotal movement under brake torque reaction.

14. An anti-skid system according to claim 1 including means for mounting the pilot brake to be slideable in a chordal direction relative to an associated brake disc.

15. An anti-skid system according to claim 1 wherein the pilot brake is positioned to engage one side only of a brake disc and incorporates a pivotally mounted housing having a pair of braking mechanisms one each side of the pivot and connected to be separately and cyclically actuated so as to cause an oscillatory movement of the housing about its pivot.

16. An anti-skid system according to claim 5 including means for returning the fluid released from the pilot brake to a reservoir associated with the driver's master cylinder.

17. An anti-skid system according to claim 1 wherein the means for effecting release of a hydraulically operated main wheel brake comprise a skid control valve connected to be operated by the skid-sensing device in an anti-skid operation to release fluid from the main wheel brake into a receiver, the pilot brake being connected to operate as a pump motor to effect re-application of the main wheel brake following a brake release operation.

18. An anti-skid system according to claim 17 wherein the said skid control valve comprises a first valve member spring-urged towards a seat normally to isolate the receiver, and a second valve member spring-urged away from a seat normally to connect the main brake to a driver's master cylinder, whereby during a sequence of brake releases and brake re-applications the said first valve member is opened to release the brake and closed to reapply the brake, and the second valve member remains seated until the sequence is completed and full pressure in the main brake is restored.

19. An anti-skid system according to claim 18 wherein the second valve member is mounted to be slidable on the first valve member.

20. An anti-skid system according to claim 17 wherein the pilot brake is fluid-pressure operated and connected to be applied and released alternately by a solenoid-operated pump.

21. An anti-skid system according to claim 17 wherein the pilot brake is connected to be actuated by fluid pressure supplied from the master cylinder through a solenoid-operated valve having means to provide a series of pulses of fluid pressure to operate and release the pilot brake alternately.

22. An anti-skid system according to claim 21 wherein the solenoid-operated valve is connected, in order to release the pilot brake, to permit fluid to pass from the pilot brake into a receiver for said fluid, the pilot brake being connected to actuate a pump to return said fluid released from the pilot brake into the main system.

23. An anti-skid system according to claim 17 wherein the pilot brake is connected to be supplied with fluid pressure through a solenoid-operated valve under the control of a limit switch actuated by the movement of the pilot brake.

* * * * *